(12) United States Patent
Berks et al.

(10) Patent No.: US 9,128,000 B2
(45) Date of Patent: Sep. 8, 2015

(54) POTENTIOSTAT DATA LINK

(75) Inventors: William I. Berks, Manhattan Beach, CA (US); Monty Moshier, Washington, UT (US)

(73) Assignee: EFS INTERNATIONAL S.A., New York, NY (US)

( * ) Notice: Subject to any disclaimer, the term of this patent is extended or adjusted under 35 U.S.C. 154(b) by 857 days.

(21) Appl. No.: 13/123,204

(22) PCT Filed: Aug. 12, 2009

(86) PCT No.: PCT/US2009/053570
§ 371 (c)(1),
(2), (4) Date: Oct. 26, 2011

(87) PCT Pub. No.: WO2010/019681
PCT Pub. Date: Feb. 18, 2010

(65) Prior Publication Data
US 2012/0283964 A1 Nov. 8, 2012

Related U.S. Application Data

(60) Provisional application No. 61/088,197, filed on Aug. 12, 2008.

(51) Int. Cl.
*G01B 5/30* (2006.01)
*G01M 5/00* (2006.01)

(52) U.S. Cl.
CPC .................................. *G01M 5/0033* (2013.01)

(58) Field of Classification Search
CPC ........ G01M 5/0033; G01M 5/00; G01B 5/30; G01N 17/04; G01N 17/02; G01N 17/00
USPC ......... 702/38, 33–36, 57, 64–65, 81, 84, 127, 702/182–185, 188–189; 204/400, 404; 205/777.5, 790, 790.5, 791.5
See application file for complete search history.

(56) References Cited

U.S. PATENT DOCUMENTS

| | | | |
|---|---|---|---|
| 4,564,422 A | 1/1986 | Simoneau et al. | |
| 5,259,944 A | 11/1993 | Feliu et al. | |
| 5,306,414 A | 4/1994 | Glass et al. | |
| 5,419,201 A * | 5/1995 | Li et al. | 73/808 |

(Continued)

FOREIGN PATENT DOCUMENTS

WO    WO 2007/040651    4/2007

OTHER PUBLICATIONS

Miceli, Marybeth, EFS System Used to Detect Active Fatigue Cracks in Bridges, Apr. 2008, The NDT Technician, vol. 7, No. 2, 10 pp.*

(Continued)

*Primary Examiner* — Toan Le
(74) *Attorney, Agent, or Firm* — Lucas & Mercanti, LLP

(57) ABSTRACT

A potentiostat data link (PDL) unit is provided which can remotely monitor the formation and growth of cracks in metal structures. A PDL includes a sealed box containing two or more modified potentiostats, a power supply, a CPU, a memory device, and computer networking capability. The PDL can be mounted in a remote, difficult-to-access location. Each potentiostat has a lead to a sensor affixed to a structure to be analyzed for the presence of growing cracks due to metal fatigue in a metal structure.

19 Claims, 4 Drawing Sheets

(56) References Cited

U.S. PATENT DOCUMENTS

| | | | |
|---|---|---|---|
| 5,629,503 A * | 5/1997 | Thomasen | 181/199 |
| 5,700,370 A * | 12/1997 | Helmo | 210/94 |
| 6,026,691 A * | 2/2000 | Laird et al. | 73/808 |
| 6,671,654 B1 * | 12/2003 | Forth et al. | 702/182 |
| 6,690,182 B2 * | 2/2004 | Kelly et al. | 324/700 |
| 6,856,932 B1 * | 2/2005 | Wallace | 702/130 |
| 6,889,165 B2 * | 5/2005 | Lind et al. | 702/183 |
| 7,572,360 B2 * | 8/2009 | Moshier et al. | 205/775.5 |
| 2002/0057097 A1 * | 5/2002 | Kelly et al. | 324/700 |
| 2007/0074976 A1 | 4/2007 | Moshier et al. | |
| 2008/0086273 A1 * | 4/2008 | Shults et al. | 702/19 |

OTHER PUBLICATIONS

International Search Report, issued in corresponding International Application No. PCT/US2009/053570.

Written Opinion, issued in corresponding International Application No. PCT/US2009/053570.

Wireless Multi-Channel HazMat Monitor, http://www.global-security-solutions.com/WirelessMultiChannelHazMatMonitor.htm.

\* cited by examiner

POTENTIOSTAT DATA LINK

CROSS-REFERENCE TO RELATED APPLICATIONS

This application is a 371 of PCT/US09/53570, filed Aug. 12, 2009, which claims the benefit of U.S. Provisional Patent Application No. 61/088,197, filed Aug. 12, 2008.

FIELD OF THE INVENTION

A potentiostat data link (PDL) unit is provided which can remotely monitor the formation and growth of cracks in metal structures.

BACKGROUND OF THE INVENTION

Electrochemical fatigue sensor (EFS) systems are known in the art as capable of detecting growing cracks due to metal fatigue in metal structures subject to cyclic stress, such as highway bridges. An EFS system for the detection of the fatigue status of a metal structure includes at least two electrochemical sensors, and a potentiostat for applying a polarizing voltage between the structure (substrate) and the sensors, which creates an electrolytic cell. EFS sensors useful for such a method are disclosed in WO 2007/040651.

An EFS system works on electrochemical principles. The structure is polarized to create a protective, passive film on the surface to be tested. A polarizing voltage between the structure and the electrode produces a DC base current in the cell. If the structure being interrogated by the EFS undergoes a cyclic stress, then the current flowing in the cell fluctuates in a complex relation to the variation of the mechanical stress state. Thus, an AC current is superimposed on the DC base current during cyclic stress. Depending on the material of the structure and the loading conditions as well as the state of the fatigue damage in the structure, the transient current of the cell provides information on the status of the fatigue damage.

Because metal structural members subject to cyclic loading and fatigue are often in difficult-to-access locations, remote sensing is an attractive means by which to monitor such locations. Sensing devices for remote use, with sensors and a wireless link to a central computer, are known. See for example the wireless gas monitor marketed by Global Security Solutions.

EFS systems are acquiring increasing importance as a monitoring tool for aging infrastructure, in particular highway bridges. Many bridges currently in use are past their planned life spans, and carrying more traffic than intended, and metal fatigue is a substantial concern. Accordingly, there is a need for improved inspection methods for inspecting bridges and other older infrastructure.

SUMMARY OF THE INVENTION

In one aspect, this invention provides a potentiostat data link (POL) unit, including a sealed box containing two or more modified potentiostats, a power supply, a CPU, a memory device, and computer networking capability. The PDL can be mounted in a remote, difficult-to-access location, and left unattended over a period of time of days to months. The box may be weather-proof. Inside the box are an electronic circuit board and a power supply. The electronic circuit board includes at least two microprocessor-controlled potentiostats, a microprocessor, data storage, and data transfer functions. Sensor leads, electrical connectors, and indicator lights protrude through the wall of the sealed box.

In another aspect, the box includes a wireless data link, based on a wireless communication standard, such as 802.11b/g, to communicate with a central computer at a site remote from the PDL.

In an embodiment, the power supply is a battery. The battery may be rechargeable. Alternatively, the PDL may be connected to the public power grid. In another embodiment, the PDL may be powered by solar cells, which may further be configured to recharge the battery.

In another aspect, the PDL may have magnetic feet which firmly affix the PDL box to a ferromagnetic structure, such as a steel beam.

In another aspect, this invention provides a method for measuring the fatigue status of metal structures, including a potentiostat data link comprising a microprocessor-controlled potentiostat, a power supply, and at least two sensor leads, where an EFS sensor is stationed at the end of each lead, and each sensor is affixed to, and in electrical contact with, a metal structure to be analyzed for fatigue status. The potentiostat applies a voltage through the sensors during cyclic loading, and measures the current passing through the sensors, digitizes the measurement and transmits the digitized data to a computer for analysis of the fatigue status of the metal structure.

In some embodiments, the PDL transmits data to a central computer in real time, permitting the quality of data to be assessed, or permitting an engineer to assess in real time the fatigue status of the structure under analysis. The communication from the PDL to a central computer may be via ethernet cabling or the wireless data link. In an alternative embodiment, all data is stored in flash memory, such as a removable memory card. The data can then be retrieved either by removing the card or wirelessly transferring the data to a computer for analysis at a later time to assess the fatigue status of the structure in question.

The PDL units of the instant invention are useful for analyzing the metal fatigue status of metal structures, such as highway or railway bridges, highway sign structures, offshore drilling platforms, ships, or aircraft frames.

DETAILED DESCRIPTION OF THE INVENTION

Figure 1:
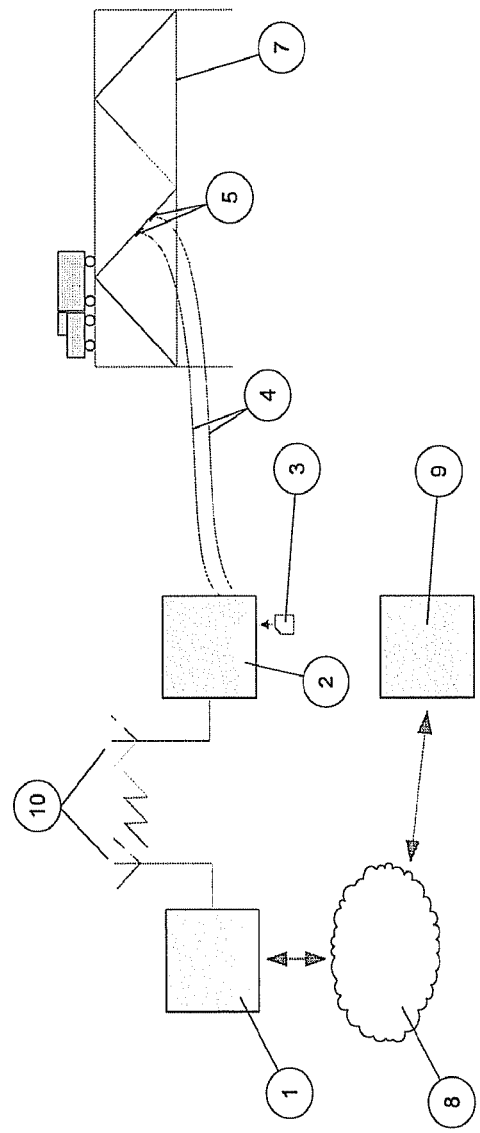
FIG. 1 is a schematic of an embodiment of the present invention.

Electrochemical Fatigue Sensor (EFS) systems are useful tools for monitoring the fatigue status of metal structures subject to cyclic stress. By the phrase "fatigue status," it is meant that EFS systems are able to assess whether a crack in a metal structure is growing during cyclic stress. Cyclic stress is stress applied to the structure in question, for example, in a highway bridge, where the flow of vehicle traffic of imposes cyclic stress on the structure. Upon detection of a growing crack, an engineer can make a decision on the severity of the problem, and the likelihood of a catastrophic failure or need for remedial repair.

In many structures subject to cyclic stress, critical structural support members are in difficult to access locations. For this reason, it is may be desirable to install a sensing device at a difficult-to-access location, and remotely monitor the data produced. Moreover, it is desirable with the inventive EFS systems to monitor critical locations over time, of anywhere from several hours to several months, to get the best possible picture of the fatigue status of a critical structural member.

Accordingly, this invention provides a potentiostat data link (PDL) device that can be used in difficult-to-access locations. In one embodiment, there is provided a potentiostat data link, that may include an enclosure; at least one pair of microprocessor controlled potentiostats, where each potentiostat has a sensor lead to a sensor affixed to a structure to be analyzed for the presence of growing cracks due to metal fatigue in a metal structure; a power supply; and a ground connection, wherein the potentiostat is used to monitor the fatigue status of the metal structure.

In another embodiment, this invention provides a potentiostat data link, that may include a weatherproof enclosure; at least one pair of microprocessor controlled potentiostats, where each potentiostat has a sensor lead to an sensor affixed to a structure to be analyzed for the presence of growing cracks due to metal fatigue in a metal structure, and each potentiostat has an analog-to-digital converter; a microprocessor; a memory storage device; at least one data communications port; a power supply; and a ground connection, wherein the potentiostat is used to monitor the fatigue status of the metal structure.

In another embodiment, this invention provides a method for measuring the fatigue status of a metal structure, that may include a potentiostat data link comprising at least one pair of microprocessor controlled potentiostats, a power supply, at least two sensor leads, and at least one ground connection, where an EFS sensor is stationed at the end of each lead, and each sensor is affixed to and in electrical contact with a metal structure to be analyzed for fatigue status; wherein the potentiostat applies a voltage through the sensors during cyclic loading, and measures the current passing through the sensors, and digitizes the measurement for analysis of the fatigue status of the metal structure.

A schematic representation of the inventive system is shown in FIG. 1, showing the relationship between the various parts, in a hypothetical analysis of the metal fatigue of a bridge 7.

The PDL units 2 have all the data collection, data processing, and data storage capability necessary for each inspection location. The PDL consists of an enclosure, an electronic circuit board, a power supply, and sensor leads. The enclosure may be weatherproof. A PDL unit may have a removable memory device 3 for storing data, such as a standard SD card or USB flash drive. Additionally, the PDL will have sensor leads 4 connected to sensors 5 affixed to a structure 7 (e.g., a bridge) to be analyzed for metal fatigue.

The power supply may be a battery, which may be rechargeable. The PDL may also have solar cells that recharge the battery.

During an analysis of a structure, the inventive PDL units are essentially robot devices to an onsite central computer 1, which can control various aspects of the analysis, such as timing of data collection, voltage produced by the potentiostat, data collection parameters, or switching various components on or off to conserve power. The central computer will be at the site of the analysis. The central computer in turn may communicate with a remote location 9, which may be via the internet 8, perhaps thousands of miles away, where technicians or engineers can monitor the analysis.

Accordingly, the PDL has computer networking capability to communicate with the onsite central computer, and the PDL unit may have an RJ45 ethernet port (IEEE 802.3). Additionally, the PDL unit may have a wireless data link 10, using a standard network communications protocol, such as 802.11b/g. In embodiments where the PDL has wireless networking capability, a wireless access point is provided, which is a commercial device that may be physically within the onsite central computer, or provided as a separate box. A wireless access point is typically a wireless router. If the PDL unit has a wireless data link, the unit will have an antenna. The antenna may have a cord, perhaps up to 10 feet long, and a magnetic base for attachment to a suitable location to provide good radio contact with the access point.

The PDL unit may have strong magnets attached to the base, which allow the user to attach the PDL to the side of a beam, such as a steel beam.

PDL Physical Description

Figure 2:
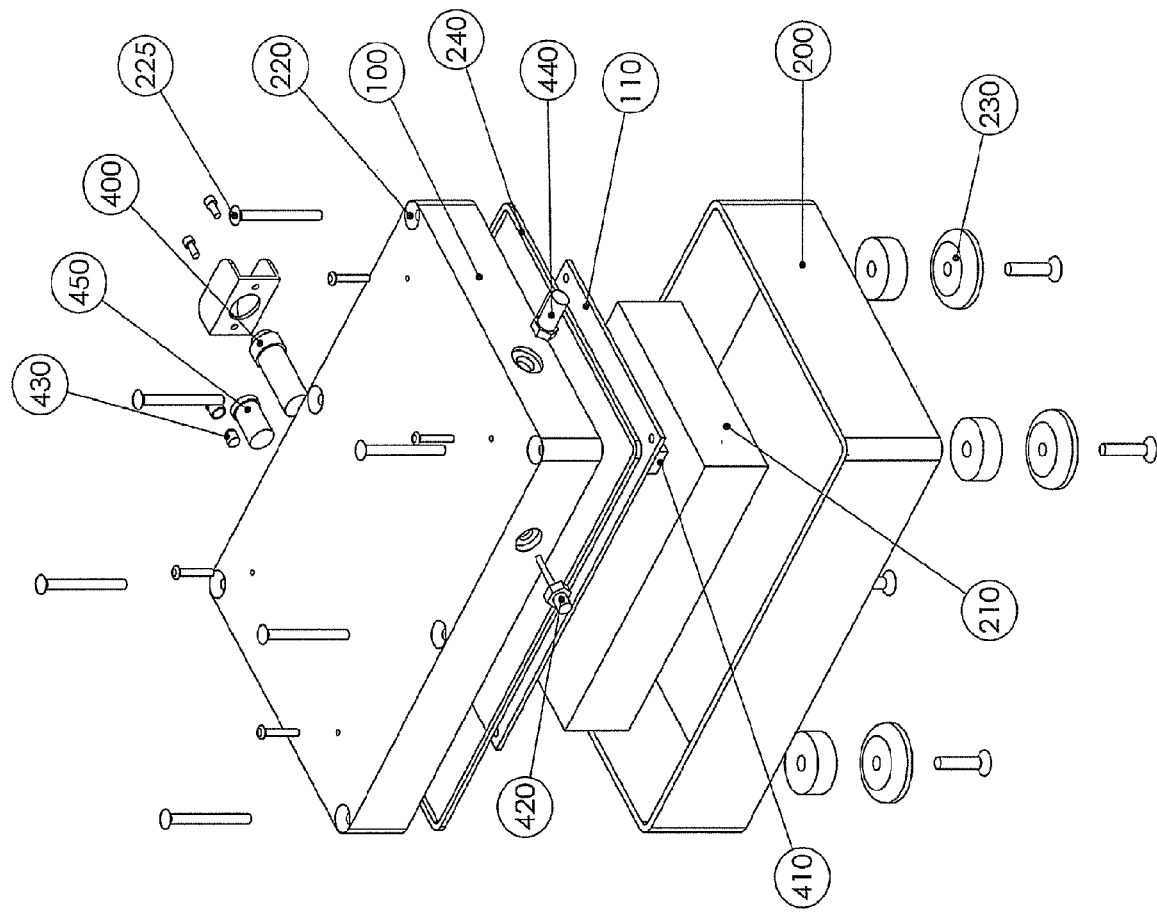
FIG. 2 is a perspective view showing how the top and bottom of the PDL unit fits together.

Referring to FIG. 2, the PDL unit may have a light-weight metal enclosure, or box. Preferably, the box is made out of aluminum. If the unit is intended to be used in an outside location, the box may be weatherproof and water-tight. The metal housing can provide electromagnetic shielding for the electronic components inside the box. In an embodiment, the box may be designed to separate into two pieces, a top 100 and bottom 200. The circuit board 110 may be mounted on the top piece 100 and the battery 210 may be mounted in the bottom piece 200. In this way, both the battery and the circuit board can be easily accessed without disturbing the other component.

In this embodiment, the top and bottom box covers can be screwed together to affix the two halves, for example as a sealed unit. The screws are depicted as 225, and the screw holes are 220. Additionally, a gasket or rubber seal 240 may be provided that provides a waterproof seal between the top and bottom pieces. This allows the PDL to function normally in inclement weather without damage to internal components. Seals may also be provided around the switches, connectors, lights, etc., where water can potentially leak into the unit.

The box is preferably provided with strong rare-earth magnets 230 as feet on the bottom. The magnets allow for quick and secure mounting to beams of bridges. Preferably, a rubber bushing is inserted between the magnets and the box to minimize vibrations from the structure to the PDL.

The box contains several outputs protruding through the wall of the box. These may include: an on/off switch 400; in a preferred embodiment, the switch is covered with a protective bracket to prevent accidental activation during shipping; a battery charge receptacle 450 to allow the battery to be charged without necessitating the box to be opened; one or more LED indicators 430, with different color lights, for example, to show that the unit is on and the battery is charged, or that the battery is charging, or that the battery charge is low; a sensor receptacle 440 for connection of the sensor cables to the PDL box; an RJ45 ethernet connector 410; and an antenna connector 420, where the wireless antenna plugs in to the PDL unit.

The battery 210 is connected to the circuit board 110 with power cables. The battery may be a compact lead-acid battery, or some other type, preferably rechargeable, such as lithium-ion or nickel metal hydride. In an alternative embodiment, the PDL may be connected to an external power source.

Electronic Circuit Board

Figure 3:
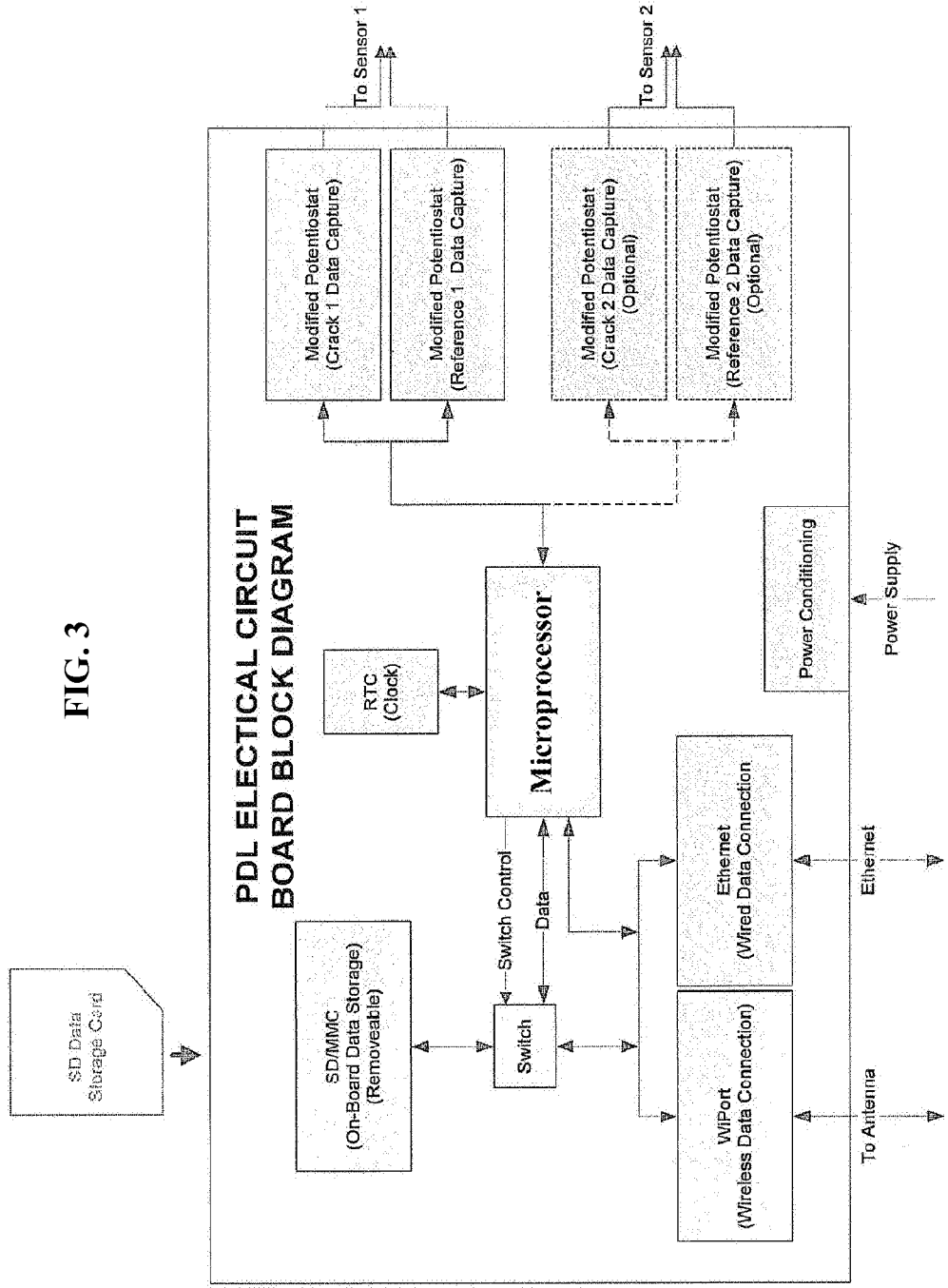
FIG. 3 is a block diagram of the PDL electronic circuitry.

Preferably, all the electronics circuits in the PDL are housed on a single circuit board. A block diagram is shown in FIG. 3. It can be logically broken down into 5 fundamental components:

Potentiostats—Consists of multiple discrete potentiostat components and is responsible for capturing sensor data. Each PDL unit has at least two potentiostats (a crack and reference pair) with the option to attach additional pairs. While physically attached to the main circuit board, the potentiostat is electrically isolated to prevent noise corruption from the other circuitry.

CPU—Central Processing Unit which executes instructions and controls other components.

Data Storage—In a preferred embodiment, the PDL contains a flash memory device, for example, an industry standard Secure Digital (SD) Card using standard FAT file format. Alternative memory devices are possible, such as a USB flash drive or compact hard drive. The memory device can store EFS data for future analysis, and programming instructions for the CPU. The flash memory may be removable.

Data Transfer—A data communications port may be provided. This may use a wireless protocol (802.11b/g) to communicate with a remote PC via an access point, for remote PDL control and data download. Where wireless networking is provided, the circuit board will have a "WiFi" module. The WiFi module is also referred to as a "WiPort." There may also be an RJ45 connector for wired connectivity, for example based on the industry standard ethernet protocol.

Power Control—The voltage levels are controlled by the CPU based on the needs of the various components. In an embodiment, a 6 volt power source is employed. This may be provided by a 6 volt battery, but other power sources are possible. For example, there may be an external power supply or solar cells that power the PDL unit or recharge the battery or both.

Additionally, the PDL may have other electronic hardware features, such as:

A real time clock used to time functions, such as data gathering functions. The Real Time Clock should have a separate battery to maintain time even when the board is entirely powered down.

Charging circuitry that allows the PDL to control the battery charging, shutting it off when the battery reaches a full charge;

LEDs which are used to visually convey the status of the PDL;

An LED charge indicator which turns from Red to Green when the battery is completely charged;

Detachable Sensor Cable and Antenna for convenience.

The Potentiostat

Figure 4:
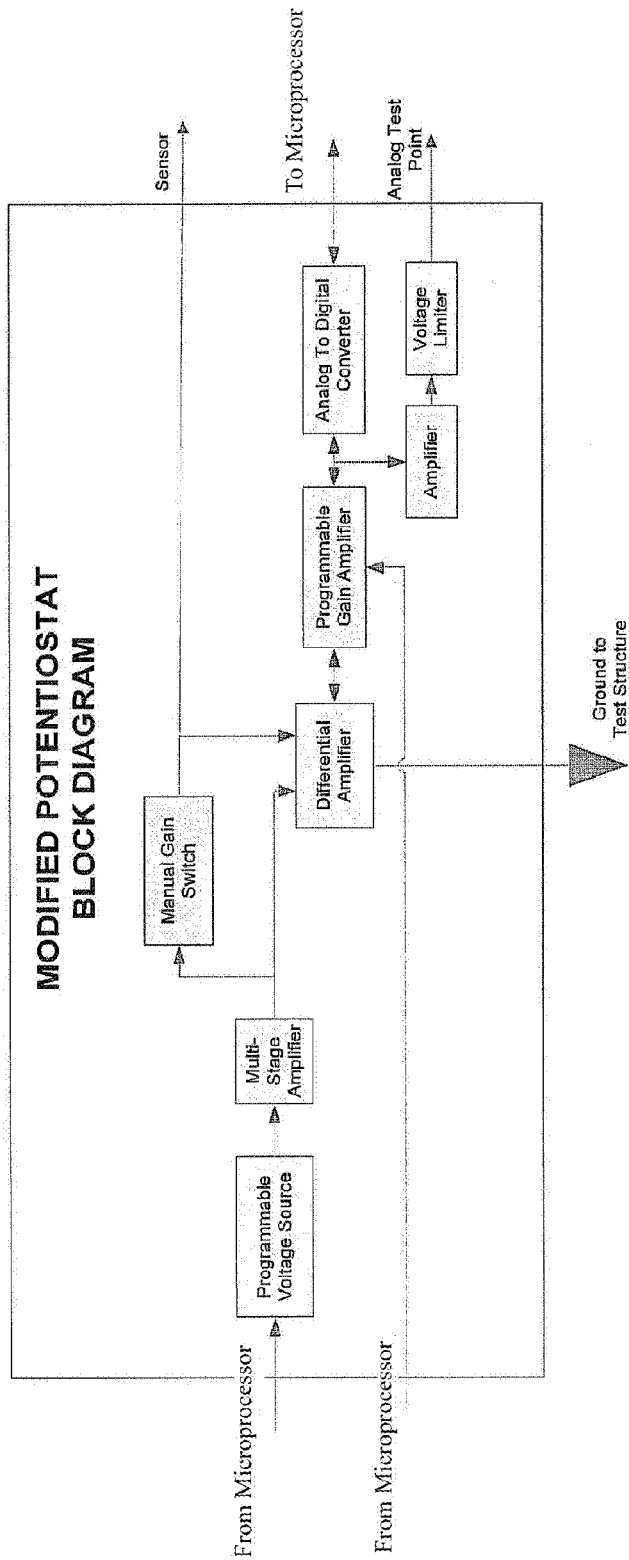
FIG. 4 is a block diagram of the components of the modified potentiostat of the instant invention.

The potentiostat is a custom designed electronic circuit, controlled by the CPU, that provides a constant programmable voltage to an EFS sensor. A block diagram of the potentiostat is shown in FIG. 4. The potentiostat measures the current passing through the sensor. The potentiostat digitizes the current measurements with an analog-to-digital converter, and provides a mechanism for passing the data to the CPU. Because of the sensitive micro-measurements that are being made, the potentiostat should be electrically isolated from the rest of the electrical circuit board to prevent noise from slipping in and corrupting the data. The potentiostat circuit also includes voltage and gain settings, adjustable from the CPU, to enable it to work on different types of metal. An amplified analog output may be provided to enable access to the actual analog data prior to it being digitized.

Each potentiostat is connected to an EFS sensor and is grounded to the structure being analyzed. An electrolytic potentiostat cell is thus formed between the sensor, the structure, and the ground.

Two sensors are required for the analysis of metal fatigue at a single crack. Thus, the inventive PDL units employ potentiostats in pairs, referred to as the "crack" and "reference" potentiostats. The reference sensor is placed near a crack or potential crack, but at a location judged to be unlikely to crack. The crack sensor is placed on or adjacent to a crack, preferably over the leading edge of a crack. The difference between the potentiostatic signal from the two sensors is employed in the analysis of the metal fatigue.

In a preferable embodiment, two or more pairs of potentiostats and sensors are provided in a single PDL unit. In this manner, multiple cracks near each other can be assessed by a single PDL unit simultaneously. In some embodiments, two or more potentiostats can share a single ground connection to the structure under test.

Computing Functions

The circuit board is designed around its microprocessor, which is a programmable flash device. The microprocessor may be in communication with a central computer. The communication may be via a network connection, either a wired ethernet connection, or a wireless connection using a protocol such as 802.11b/g. In another embodiment, a central computer is used to program each PDL unit before installation at the measurement site, where the PDL units operate independently for a period of time. In this embodiment, all data will be saved to an internal memory device, which is removed and analyzed later.

In a typical installation with a network connection to each PDL, there may be several, possibly as many as dozens of PDL units at a single site. A central computer programs and controls each PDL unit. The parameters controlled may include start and stop times for data collection, voltage parameters for the potentiostat, and data collection parameters, such as the sampling rate by the analog-digital converter. Voltage parameters can vary depending on the structure under test, so that for each structure and set of sensors, there is a voltage that provides an optimum signal to noise ratio. The central computer can monitor each PDL and transmit instructions on optimal signal collection parameters.

The data from each PDL may be stored locally, for example on rewritable media such as an SD card, and can optionally be transmitted to the central computer in real time. If transmitted in real time, an analyst can monitor the fatigue-detecting signal in real time to determine, for example, the quality of the signal, or to make a manual judgment as to the fatigue status of the structure being tested.

In an embodiment, the memory device may be a flash memory device, such as an SD card or a USB flash drive. Flash memory is a non-volatile computer memory that can be electrically erased and reprogrammed. This technology is primarily used in memory cards and USB flash drives for general storage and transfer of data between computers and other digital products. Flash memory devices employ a specific type of EEPROM (Electrically Erasable Programmable Read-Only Memory) that is erased and programmed in large blocks. Flash memory is non-volatile and no power is needed to maintain the information stored in the device.

Among the functions of the microprocessor in the PDL in the instant invention are the following:

The operating instructions for the microprocessor are stored in the memory device, such as the flash memory. Flash memory is preferred because it has lower power consumption than a disk drive, and enables the PDL microprocessor to start and stop almost instantaneously.

The microprocessor can enable or disable power to the potentiostat. It also specifies the potentiostat voltage and reads the digitized data. It encrypts the digitized data and stores it in a local buffer. When the buffer is full, it writes the entire buffer of data to the flash memory.

The microprocessor may receive instructions from the central computer on data collection parameters (start time, duration, sample rate, etc). These parameters are stored on the flash memory, and loaded each time at power up. This allows the data collection parameters to be set well in advance of when the data is collected, or even prior to the PDL being set up at the inspection location.

The microprocessor may synchronize an on-board real-time clock with the on-site central computer (FIG. 1, no. 1) each time the computer connects to the PDL, ensuring that both are working within the same time frame. The real-time clock is used to identify when data collection should start based on previously set parameters.

The microprocessor can also conserve battery power by enabling or disabling power to the WiFi module (if present) and the potentiostat board based on configuration parameters. This is a particularly useful feature where inspection locations may be remote with no external power available, and the PDL may be configured to collect data over an extended period of days, weeks, or months. In such a situation, power conservation can be important.

The microprocessor can be instructed to stream real-time sensor data from the potentiostat to the central computer via a network connection. This is an essential feature when installing sensors to ensure that they are installed correctly. When problems are discovered early, it allows the installer to fix the problem before leaving the location.

The microprocessor acts as the "middle man" for most communication with the on-site computer. However in certain instances, it is more efficient to take the microprocessor out of the communications link. For example, when downloading a data file, the microprocessor instructs the WiFi module to communicate directly to the storage device. This increases both speed and efficiency.

The microprocessor runs a set of instructions on firmware. The behavior of the microprocessor can be modified by loading new firmware. The firmware is stored in flash memory, and will remain even when the battery is completely removed from the PDL. Some of the aspects of the PDL firmware may be:

Wireless Upgradeable—As new improvements are made in the firmware, the firmware can be wirelessly uploaded to the PDL to easily allow upgrades.

Programmable Data Acquisition—The PDL can be programmed to wirelessly capture data hours or days in the future, limited only by the life of the battery.

Power Options—The PDL has several options to conserve power. The potentiostats can be disabled when not in use, and the wireless chip can be turned off for either a selectable number of minutes per hour, or until some point in the future. These features can dramatically extend the life of the battery.

Real Time Streaming Data—Data from the potentiostat can be either saved to the SD card, or wirelessly streamed to the PC. This allows for real time sensor monitoring and early detection of sensor installation problems.

Remotely Configurable—The PDL can be configured remotely, including sample rates, potentiostat voltage, PDL name, etc.

Remote Monitoring—Battery voltage, program status, data file list, etc can be viewed remotely on a PC.

Remote Data Download—Data can be wirelessly downloaded to a PC at a future time. The user simply requests a list of the files that have been saved and selects the desired files for download.

Additionally, firmware is upgradeable, so new features can be added with a simple firmware upgrade.

An industry flash memory card such as an SD card is advantageous. In some embodiments, the PDL was designed with an on-board slot for rewriteable flash memory media, such as a standard FAT-formatted SD multi-media flash card or a USB flash drive. This allows data to be stored internally for later analysis. An SD data card or USB flash drive is removable and easily swappable. The flash memory may store instructional information, such as when to capture data (i.e., specific times of day), how much data to capture, and other critical parameters. While it is often necessary to download data over the wireless link to the computer, at times it may be easier to wait until all the data is captured, then at a later convenient time, remove the card from the PDL and upload the data directly to a computer from the flash memory device.

The invention claimed is:

1. A potentiostat data link, comprising:
an enclosure;
at least one pair of microprocessor controlled potentiostats, wherein each potentiostat: (a) has a sensor lead to a sensor affixed to a structure to be analyzed for the presence of growing cracks due to metal fatigue in a metal structure, (b) comprises a programmable voltage setting and an analog-to-digital converter and (c) is electrically isolated from the rest of an electronic circuit board of the device;
a power supply; and
a ground connection,
wherein the potentiostat is used to monitor the fatigue status of the metal structure.

2. The potentiostat data link of claim 1, further comprising a network connection to another computer.

3. The potentiostat data link of claim 1, further comprising a memory device.

4. The potentiostat data link of claim 1, wherein the enclosure is a weatherproof box.

5. The potentiostat data link of claim 1, wherein the enclosure has magnetic feet for affixing the enclosure to a ferromagnetic structure.

6. The potentiostat data link of claim 1, wherein the power supply is a rechargeable battery.

7. A potentiostat data link, comprising:
a weatherproof enclosure;
at least one pair of microprocessor controlled potentiostats, where each potentiostat has a sensor lead to a sensor affixed to a structure to be analyzed for the presence of growing cracks due to metal fatigue in a metal structure, and each potentiostat has an analog-to-digital converter comprises a programmable voltage setting and is electrically isolated from the rest of an electronic circuit board of the device;
a microprocessor;
a memory storage device;
at least one data communications port;
a power supply; and
a ground connection,
wherein the potentiostat is used to monitor the fatigue status of the metal structure.

8. The potentiostat data link of claim 7, wherein the microprocessor has a CPU, firmware, software, and random access memory.

9. The potentiostat data link of claim 7, wherein data produced by the analog-to-digital converter is stored in files on the memory storage device.

10. The potentiostat data link of claim 9, wherein the memory storage device is a flash memory device.

11. The potentiostat data link of claim 7, wherein the memory device is removable.

12. The potentiostat data link of claim 7, wherein data produced by the analog-to-digital converter is transmitted in real time to a central computer.

13. The potentiostat data link of claim 7, wherein a wireless connection transmits the data produced by the analog-to-digital converter to a central computer.

14. The potentiostat data link of claim 7, wherein the data communications port is an ethernet port.

15. The potentiostat data link of claim 7, wherein the data communications port is a wireless network device.

16. A method for measuring the fatigue status of a metal structure using a potentiostat data link comprising:
 a potentiostat data link comprising at least one pair of microprocessor controlled potentiostats wherein each potentiostat (a) has a sensor lead to a sensor affixed to a structure to be analyzed for the presence of growing cracks due to metal fatigue in a metal structure, (b) comprises a programmable voltage setting and an analog-to-digital converter and (c) is electrically isolated from the rest of an electronic circuit board of the device,
 a power supply,
 at least two sensor leads, and
 at least one ground connection,
 where an EFS sensor is stationed at the end of each lead, and each sensor is affixed to and in electrical contact with a metal structure to be analyzed for fatigue status;
 wherein the potentiostat applies a voltage through the sensors during cyclic loading, and measures the current passing through the sensors, and digitizes the measurement for analysis of the fatigue status of the metal structure.

17. The method of claim 16 further comprising a central computer and one or more potentiostat data link devices, wherein each potentiostat data link transmits data in real time to the central computer.

18. The method of claim 16 wherein the metal structure is selected from a highway or railway bridge, a highway sign structure, an offshore drilling platform, a ship, and an aircraft frame.

19. The method of claim 16, wherein the metal structure is a highway or railway bridge.

* * * * *